G. W. NELSON.
FOOT MEASURING DEVICE.
APPLICATION FILED MAR. 1, 1920.
1,429,963.
Patented Sept. 26, 1922.
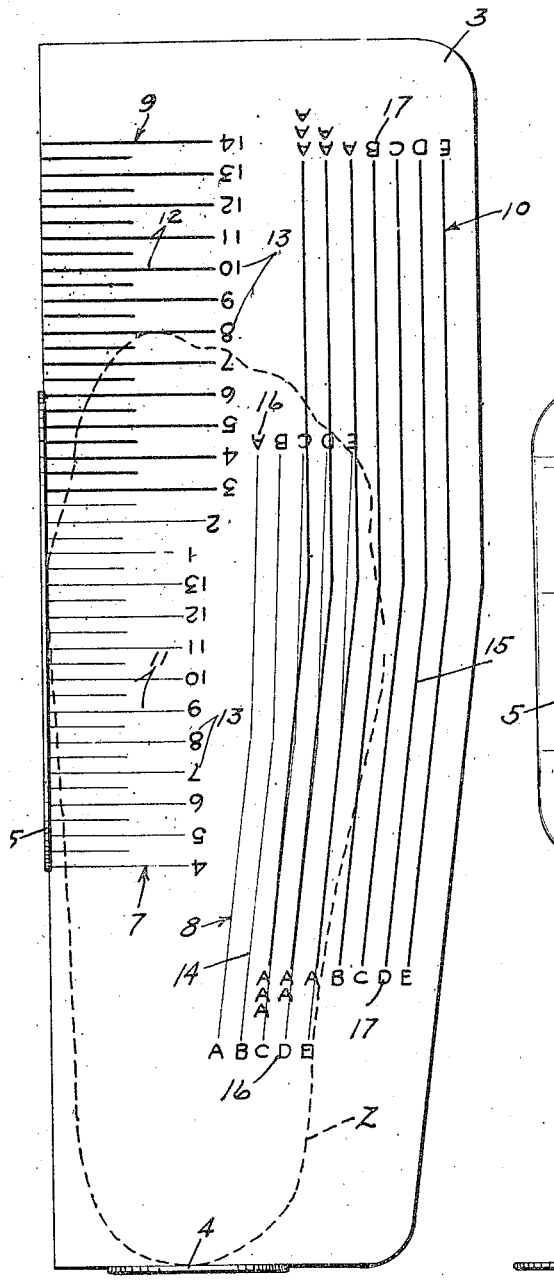
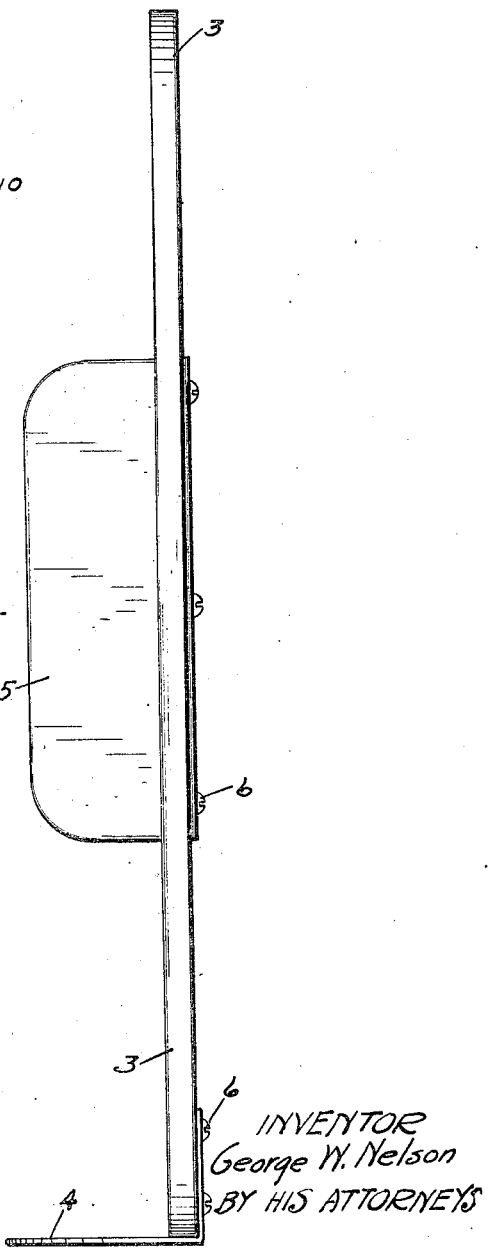
INVENTOR
George W. Nelson
BY HIS ATTORNEYS Patented Sept. 26, 1922.

1,429,963

UNITED STATES PATENT OFFICE.

GEORGE W. NELSON, OF MINNEAPOLIS, MINNESOTA.

FOOT-MEASURING DEVICE.

Application filed March 1, 1920. Serial No. 362,359.

*To all whom it may concern:*

Be it known that I, GEORGE W. NELSON, a citizen of the United States, residing at Minneapolis, in the county of Hennepin and State of Minnesota, have invented certain new and useful Improvements in Foot-Measuring Devices; and I do hereby declare the following to be a full, clear, and exact description of the invention, such as will enable others skilled in the art to which it appertains to make and use the same.

My invention has for its object to provide an extremely simple and highly efficient foot-measuring device intended for general use, but especially adapted for chiropodists in advising patients the size shoe they should wear.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:—

Fig. 1 is a plan view of one form of the invention having indicated thereon a foot positioned to measure the length and width thereof; and Fig. 2 is a side view of the same.

The numeral 3 indicates a support which, as shown, is a flat board having secured to one of its ends and one of its sides foot-positioning heel and side flanges 4 and 5, constituting end and side gauges respectively. These flanges 4 and 5 are preferably made of sheet metal, having their lower edge portions bent laterally under the board 3 and secured thereto by screws 6.

A chart, having a foot length scale 7 and a foot width scale 8, for children, and a foot length scale 9 and a foot width scale 10, for adults, is marked directly on the support 3, but it is, of course, understood that the same may be marked on a sheet of paper or other material. The scales 7 and 9 include transverse lines 11 and 12, respectively, that are made alternately long and short to indicate full sizes and half sizes, respectively. The lines 11 and 12 are indicated by identifying characters 13, towit: the numerals 4 to 13, inclusive, and 1 to 14, inclusive, which read from the heel toward the toe of the chart. These numerals are preferably located at the opposite ends of the long lines 11 and 12, from the side flange 5, and are readable from the toe end of the chart.

The scales 8 and 10 include longitudinal lines 14 and 15, respectively, that extend from the heel end of the chart and progressively diverge from the side flange 5, and then extend substantially parallel to said side flange. The lines 14 are indicated by identifying characters 16, towit: the letters A to E, inclusive, and the lines 15 are indicated by identifying characters 17, towit: AAA, AA and A to E, inclusive. The identifying characters 16 and 17 are placed at both ends of the lines 14 and 15 and so arranged that they may be read either from the heel or the toe of the chart.

To clearly distinguish the foot length scale and foot width scale for children from the foot length scale and foot width scale for adults, the former of said scales are indicated on the drawings by light lines, while the latter of said scales are indicated by heavy lines. In actual practice, the scales 7 and 8 may be distinguished from the scales 9 and 10 by making the same of different colors, if so desired.

A foot Z is indicated on the chart in correct position to be measured as to length and width. The lines 15 constitute the width scale for men's and women's feet and the lines 14 constitute the width scale for children. It has been found by experiment that the same width scale cannot be used for both men's and women's feet. However, by inclining the lines 15 toward the side flange 5, as shown in Fig. 1, the correct relation between the length scale and width scale is secured and one set of lines is also made to serve for both men's and women's feet, so that one set of designations or identifying characters 17 can be used. The lines 14 are also arranged at different angles, so as to give the correct relation between the width scale 8 and the scale 13, which are both for children's sizes.

What I claim is:

1. A chart for measuring feet having end and side gauges extending at right angles to each other, a length scale and a width scale, the latter comprising parallel lines inclined laterally toward the side gauge at their portions which are adjacent the end gauge and parallel to the side gauge at their other ends whereby the same lines are used for measuring women's and men's feet.

2. A chart for measuring feet having in combination a side flange and an end flange extending at right angles to each other, length scales comprising parallel lines normal to the side flange, a width scale comprising a series of parallel lines, the ends of which, adjacent the end flange, are inclined toward the side flange and the other ends of which are parallel to the side flange, and another series of parallel lines having one portion inclined toward the side flange and the other parts thereof inclined toward the side flange at a lesser angle, the first width scale constituting a scale for women's and men's feet and the latter series of lines constituting the width scale for children's feet.

3. The structure set forth in claim 2, one portion of the lines of said last mentioned series coincident with the inclined portions of the lines of said width scale.

4. A chart for measuring feet comprising a plate having side and end gauges extending at right angles to each other, a children's length scale and an adults' length scale comprising adjoining series of parallel lines extending normal to the side gauge and adjacent thereto, and a length scale for adults comprising a series of parallel lines, a portion of which lines extend parallel to the side gauge, and a portion of which are inclined toward the same, and a children's length scale comprising a series of parallel lines, a portion of said lines being inclined toward the side gauge and another portion of said lines being inclined to the gauge at a lesser angle.

In testimony whereof I affix my signature in presence of two witnesses.

GEORGE W. NELSON.

Witnesses:
EVA E. KÖNIG,
HARRY D. KILGORE.